United States Patent [19]

Chou et al.

[11] Patent Number: 5,638,444
[45] Date of Patent: Jun. 10, 1997

[54] SECURE COMPUTER COMMUNICATION METHOD AND SYSTEM

[75] Inventors: Wayne W. Chou, Ridgefield; Joseph M. Kulinets, Stamford, both of Conn.

[73] Assignee: Software Security, Inc., Darien, Conn.

[21] Appl. No.: 460,131

[22] Filed: Jun. 2, 1995

[51] Int. Cl.$^6$ ................................................ H04L 9/08
[52] U.S. Cl. ...................................... 380/21; 380/25
[58] Field of Search ..................... 380/4, 21, 24, 380/25

[56] References Cited

U.S. PATENT DOCUMENTS

| | | | |
|---|---|---|---|
| 4,223,403 | 9/1980 | Konheim et al. | 380/25 |
| 4,649,233 | 3/1987 | Bass et al. | 380/21 |
| 4,906,828 | 3/1990 | Halper | 380/24 |
| 5,056,140 | 10/1991 | Kimbell | 380/23 |
| 5,144,667 | 9/1992 | Pogue, Jr. et al. | 380/45 |
| 5,148,578 | 9/1992 | Matyas et al. | 380/21 |
| 5,182,770 | 1/1993 | Medveczky et al. | 380/4 |
| 5,280,527 | 1/1994 | Gullman et al. | 380/25 |
| 5,483,596 | 1/1996 | Rosenow et al. | 380/21 |
| 5,515,441 | 5/1996 | Faucher | 380/21 |

*Primary Examiner*—Salvatore Cangialosi
*Attorney, Agent, or Firm*—Parmelee, Bollinger & Bramblett

[57] ABSTRACT

Communication between a plurality of computers which are intercoupled or networked is provided in confidential form using password protection in combination with a special hardware token which is used to generate a one-time random session ciphering key.

5 Claims, 3 Drawing Sheets

SECURE COMPUTER COMMUNICATION METHOD AND SYSTEM

BACKGROUND OF THE INVENTION

This invention relates to a method and apparatus for providing secure and ciphered communications between any type of computer, including laptops and palmtops, using one-time random session ciphering keys. The method is based on password protection in combination with a special hardware device—token used for secure generation of one-time random session ciphering keys.

With the advent of more personal information sharing, electronic mail, commercial transactions and the like taking place on-line, in many instances it is desirable to protect such information transfers. Encryption methods incorporated in the computers per se are vulnerable to computer hackers when access to such computers is available.

SUMMARY OF THE INVENTION

Accordingly, it is an object of this invention to provide a new and improved method and apparatus of providing secure communications between intercoupled computers.

In carrying out this invention in one illustrative embodiment thereof, a ciphered communications method between users through their interconnected computers is provided comprising the steps of connecting hardware tokens to each computer, each token having an unduplicated and unalterable serial number incorporated therein, selecting secret user passwords and storing said passwords in non-volatile memories inside each token, creating a table inside each hardware token that lists the serial numbers for tokens of all possible respondents in the communication system together with their identification numbers, generating a random session key inside the first token belonging to the first user who wishes to start the ciphered communication as a response to a valid first user password, deriving an encryption key inside the first token based on said unique first token serial number in combination with a unique second token serial number, where the second token serial number is received from said table in response to the identification number of a respondent, encrypting a random session key using said encryption key, supplying the encrypted session key together with the unencrypted session key to the first computer where the unencrypted session key is used as a ciphering key for ciphering the data to be transmitted securely, and transmitting said enciphered data together with the encrypted session key to the recipient computer. The above method further comprises the steps of the reception of the enciphered data together with the encrypted session key by the recipient, supplying the encrypted session key to said second hardware token together with the identification number of first user who transmitted the enciphered data, deriving a decryption key inside the second token based on the unique second token serial number in combination with the unique first token serial number, where the first token serial number is received from the table of the recipient in response to the identification number of first user and to a valid second user password, decrypting the encrypted session key inside the second token using said decryption key, transmitting the decrypted session key to the second computer and deciphering the ciphered data with the session key.

BRIEF DESCRIPTION OF THE DRAWINGS

The invention together with further objects, features, aspects and advantages will be more clearly understood from the following description taken in connection with the accompanying drawings.

DESCRIPTION OF THE PREFERRED EMBODIMENTS

Figure 1:
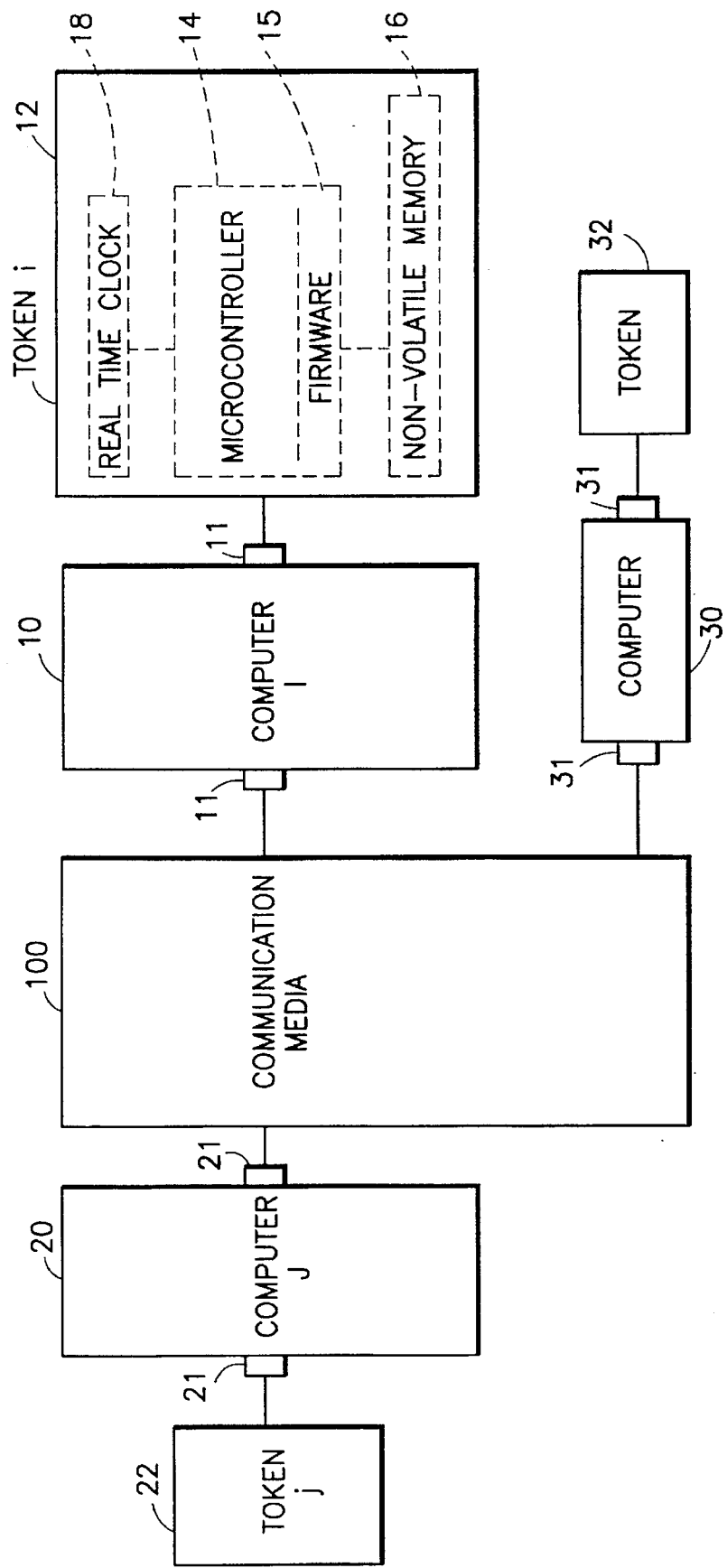
FIG. 1 is a block diagram of the secure computer communication system in accordance with the present invention.

Referring now to FIG. 1, a computer network of intercoupled computers 10, 20, 30, etc. via computer ports 11, 21 and 31, respectively, and communication media 100 such as a network (LAN, WAN, wireless, etc.) or communication channels including modems is illustrated to permit secure ciphered communications between computers in accordance with the present invention. The ciphered communications is based on the use of a one-time session enciphering key derived and encrypted inside the hardware token, transferred to the respondent together with the enciphered message and decrypted inside the respondent hardware token together with the password protection of all the operations inside hardware tokens.

Each hardware token 12, 22, 32, etc., for example, as is illustrated in connection with the token 12, includes a programmed microcontroller 14 with the incorporated firmware programs 15, that cannot be read outside the token, a non-volatile memory 16, unduplicated and unalterable serial number, that can be stored in a non-volatile memory 16 or be incorporated into firmware 15, and a real time clock 18. Non-volatile memory 16 retains all the data written even after the power for the hardware token is cut off.

The firmware 15 inside the microcontroller 14 performs the functions of a random number generator using the random input from the real-time clock 18.

Each user of the system operating from the respective computer 10, 20, 30, etc. chooses a user password that is stored in the respective non-volatile memory 16 of hardware token 12, 22, 32, etc. connected to each computer 10, 20, 30, etc. Inside the non-volatile memory 16 of each token, there is a special table which contains the identification numbers of all the possible respondents for this user in the communications system, thereby providing an index for the entry of the respective serial numbers of all the respondents hardware tokens. Accordingly, before the actual secure communication takes place, the users of hardware tokens 12, 22, 32, etc. will exchange their serial numbers which are entered into their respective hardware tokens together with the established identification numbers. For each possible respondent to securely communicate with a given user, the user's hardware token must contain an entry in the above table having the identification number and serial number of the hardware token of the respondent with whom communication is to be conducted.

Security in accordance with the present invention is based on using constantly changing one-time session keys for each communication session between any pair of users or for a part of such a communication session. The generation of the session key is accomplished inside the hardware token of the user, who initiates the communication which, in this illustrated example, is token 12. The session key (SK) is generated by microcontroller 14 based on a constantly changing output of a pseudo-random number (PRN) generator and a secret algorithm in the microcontroller 14 implemented in the firmware 15 of the microcontroller 14 together with the real random factor taken by microcontroller 14 from the real-time clock 18.

Upon generation, the session key SK is encrypted using a special encryption key EK. The encryption key is derived by the microcontroller 14 from the two unique serial numbers of two hardware tokens belonging to the communicating parties using the secret algorithm implemented in the firmware 15. The first serial number is the serial number of the sender's hardware token 12 that performs the generation of the EK. The second serial number is accessed from the table inside the non-volatile memory 16 of the hardware token 12 based on the identification number of the communicating party supplied from the computer 14 which, for purposes of illustration, will be assumed to be token 22(j).

The generation of the session key SK together with the encryption key EK and encryption of the session key is performed inside the hardware token 12 only upon presentation of the valid password by the user. To do this, the user types the valid password on the keyboard of the computer 10 whose input/output port 11 has the hardware token 12 connected thereto. The computer 10 transmits the password to the hardware token accompanied by the respective instruction and receives as a response the unencrypted session key SK together with the encrypted session key ESK. The session key SK is supplied to the software inside the computer 10 to perform the ciphering of the data to be sent. The encrypted session key is also transmitted to the software where it is incorporated into the ciphered data for the transmission to another party, e.g., computer 20 and the party with token 22.

The enciphered data together with the encrypted session here incorporated therewithin are transmitted to the computer 20 of the second user through the communication media 100 using any type of the communications software and protocols. The computer 20 at the receiving side parses the received message and isolates the encrypted session key ESK.

The second user transmits the encrypted session key together with the identification number of the sending party and the valid second user password through the computer 20 to his hardware token 22. The receiver's hardware token 22 uses the sending party's identification number to extract the serial number of the first hardware token 12 from the table in its non-volatile memory 16, after which the decryption key is derived which is a counterpart for the encryption key EK and is used to decrypt the encrypted session key SK. Based on decryption key DK, the hardware token 22 decrypts the encrypted session key ESK to reveal the session key SK. The decrypted session key SK is transmitted from the recipient hardware 22 token to the computer 20 of the receiving party where it is used to decipher the ciphered message.

Only possession of the user's password and a particular token can provide the capability to perform the ciphering of the data to be transmitted at one end of the communication system and to perform the deciphering of the received ciphered data at another end. The existence of respondent's token serial number in the user's hardware token is also required, but the initial exchange of serial numbers may be made using open communication channels.

As previously stated, each hardware token, e.g., token 12, has a unique and unalterable serial number SN assigned thereto which is permanently and unalterably stored in non-volatile memory 16 or is incorporated into the firmware 15 of the microcontroller 14. In order to establish the secure communication, the users exchange SNs and enter the SNs of all potential respondents into the tables in the non-volatile memory of their respective hardware token.

Each user also supplies its own password UPW to the hardware token 12. The password is stored in the non-volatile memory 16 to guaranty that nobody can use the token in the absence of the legitimate user. The user's password UPW is requested from the user by the computer software and is supplied to the hardware token to start the generation and encryption of the session key SK at the transmitting end or to start the decryption of the encrypted session key ESK at the receiving end of the communications system.

Figure 2:
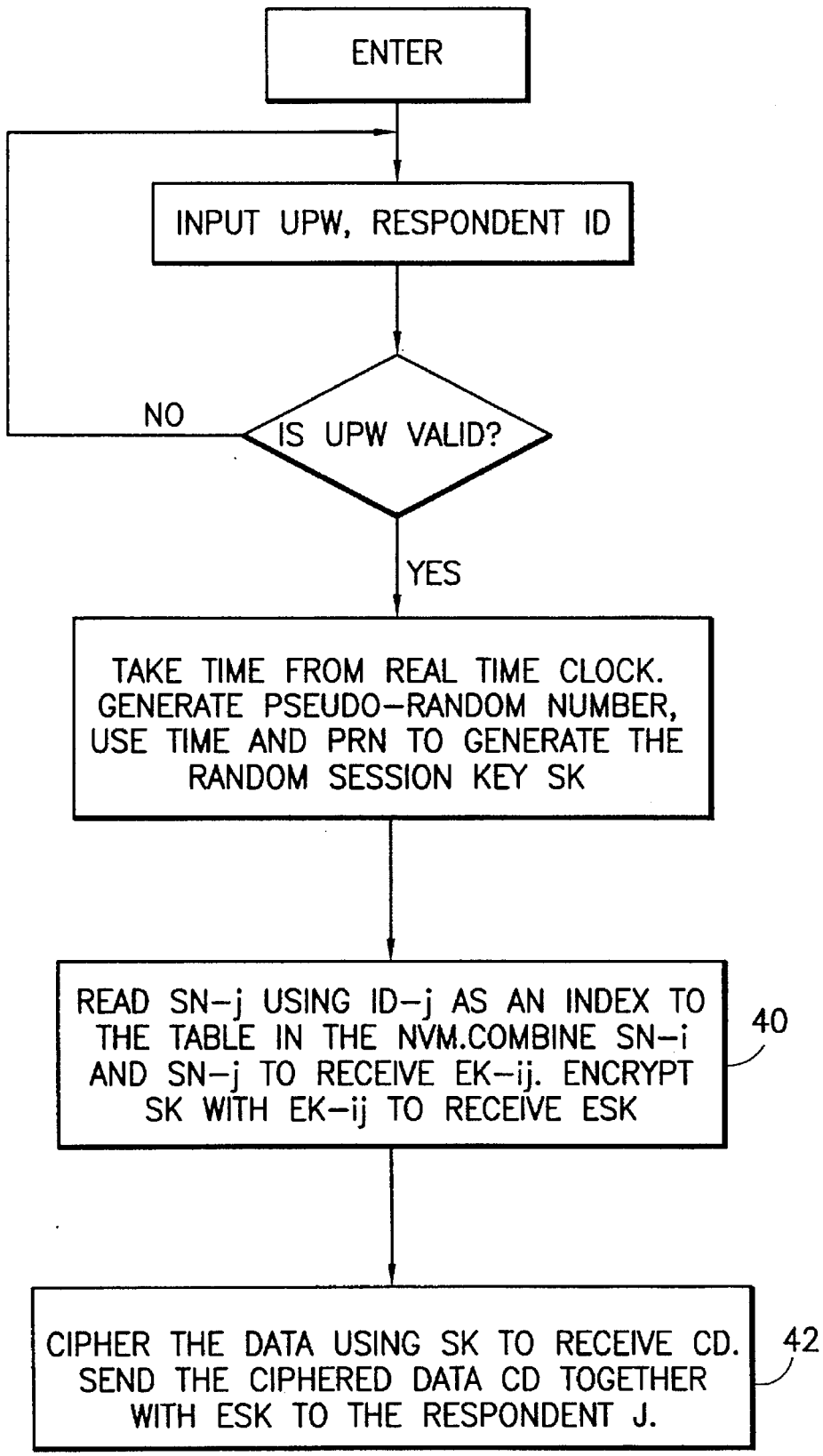
FIG. 2 is a flow chart illustrating secure communication from a sending computer to a receiving computer.
Figure 3:
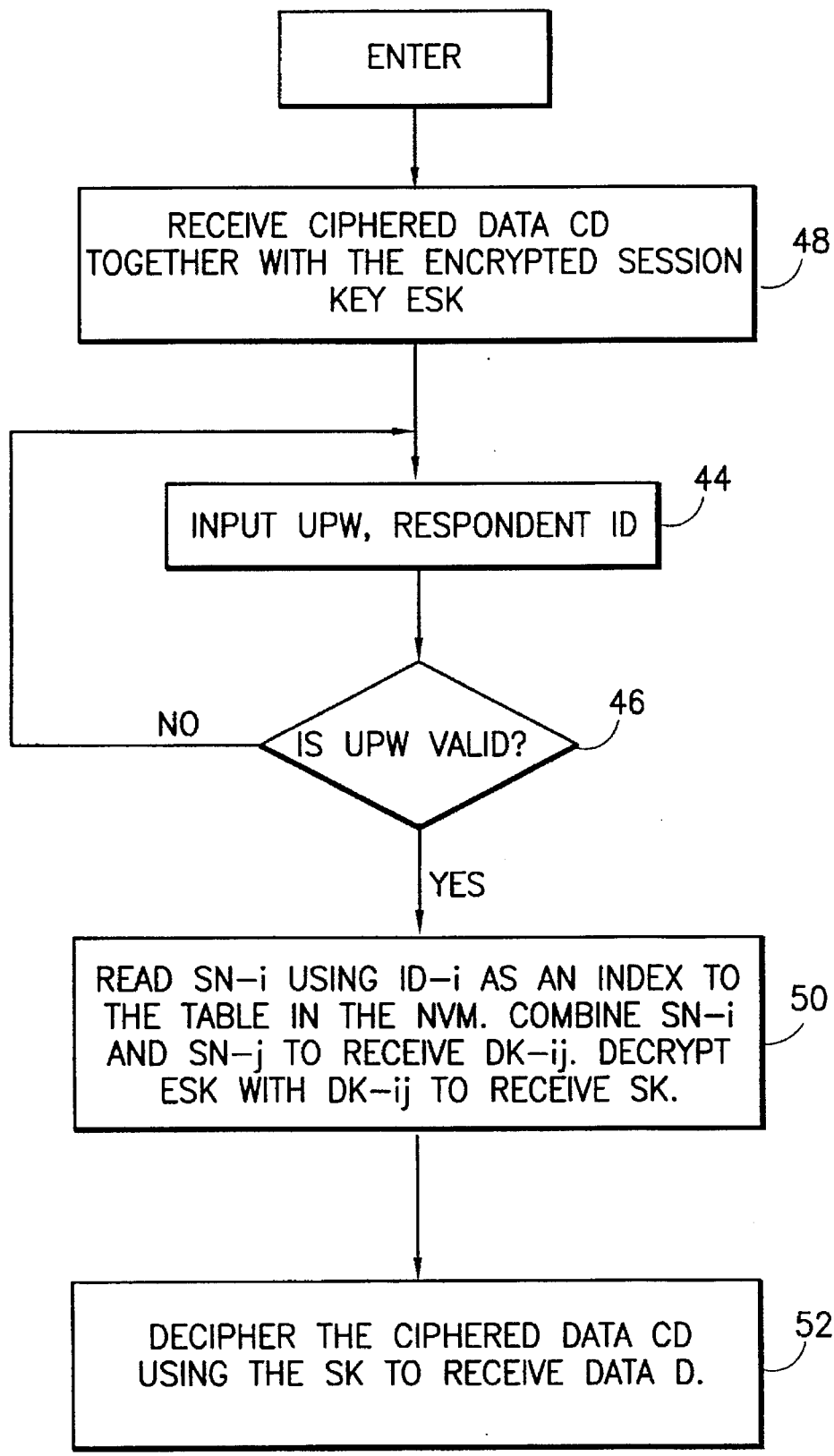
FIG. 3 is a flow chart illustrating the deciphering process at the receiving computer.

Referring now to FIGS. 2 and 3, to better illustrate the operation, suppose user I (computer 10) wishes to communicate with the user J (computer 20). Upon I's request, the computer 10 connected to hardware token 12 supplies to the token 12 the user I's password UPW-i together with the identification number of the user J. As will be seen in FIG. 2, if the user I's password is not valid, token 12 rejects the operation until a valid password is presented.

Upon reception of the valid password, the microcontroller 14 inside the hardware token 12 generates a random session key SK using the two separate input values comprising the time information from the real-time clock 18 and the output of the pseudo-random number (PRN) generator incorporated in the firmware 15 of the microcontroller 14. The current state of the pseudo-random number generator is taken from the non-volatile memory (NVM) 16. It is modified during every cycle of the pseudo-random number generation and the new current state is saved in the non-volatile memory 16.

The microcontroller 14 combines the two separate input values in a secret algorithm to receive a temporal random session key SK which is transmitted to the computer 10 for use during the ciphering of data to be securely transmitted.

After that, the microcontroller 14 reads the hardware token 12 serial number and looks internally to the entry with identification number J in the table inside the non-volatile memory 16, reads serial number SN-j for the hardware token of the user J and then combines the two serial numbers SN-i and SN-j in another secret algorithm to generate the encryption key EK-ij. The generation of the EK-ij is done on-the-fly inside microcontroller 14 and EK-ij never appears outside the hardware token 12.

The session key SK is internally encrypted in hardware token 12 using encryption key EK-ij to provide the encrypted session key ESK (see FIG. 2, block 40).

Session key SK and the encrypted session key ESK are both supplied from the hardware token 12 to the communication system software of the computer 10. The software uses SK to cipher the data D to be transmitted between the parties during the current communication session and to receive the ciphered data CD. The encrypted session key ESK is thereafter incorporated into ciphered data CD and then sent together with the CD to user J, as shown in block 42.

The ciphered data CD together with the incorporated encrypted session key ESK are transmitted from computer 10 to computer 20 through the communication media 100 under the control of the communication system software in both computers.

The deciphering process is shown on the flow chart of FIG. 3. To decipher the transmitted ciphered data, the user J must supply his hardware token 22 with his password together with the identification number of the originating user I (ID-i), block 44. The computer 20 receives the encrypted session key and ciphered data, block 48. The computer sends the microcontroller in hardware token 22 the user password, the validity of which is checked, block 46.

The sender serial number SN-i is read based on the supplied user I's identification number from the non-volatile memory by the microcontroller in the hardware token 22. Simultaneously, the microcontroller of token 22 reads the serial number SN-j of token 22 and combines serial numbers SN-i and SN-j using the special secret algorithm to receive decryption key-DK-ij (see block 50) that is a counterpart for the encryption key EK-ij and should be used to decrypt the encrypted session key SK. This algorithm could be the same that was used during the encryption process in which case the encryption and decryption keys EK-ij and DK-ij could be the same or the algorithms could be complimentary to each other and the keys will be different.

The microcontroller in the hardware token 22 uses SK-ij to perform the internal decryption of the encrypted session key ESK and transmits the resultant unencrypted session key SK to the communication system software in the computer 20.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A method of providing ciphered communications between interconnected first and second computers having first and second hardware tokens, respectively, comprising the steps of:
    incorporating an unduplicated and unalterable serial number within each token,
    selecting and storing secret user passwords in a non-volatile memory inside each token,
    creating a table inside each hardware token that lists the serial numbers for tokens of all possible respondents in the communication system together with their identification numbers,
    generating a random session key inside the first token belonging to the first user who wishes to start the ciphered communication as a response to a valid first user password,
    deriving an encryption key inside the first token based on the unique first token serial number in combination with the unique second token serial number, where the second token serial number is received from the above table in response to the identification number of respondent,
    encrypting a random session key using said encryption key,
    supplying the encrypted session key together with the unencrypted session key to the first computer where the unencrypted session key is used as a ciphering key for ciphering the data to be securely transmitted,
    transmitting the said enciphered data together with said encrypted session key to the recipient's computer,
    receiving of the enciphered data together with encrypted session key by the recipient,
    supplying the encrypted session key to the second hardware token together with the identification number of first user who transmitted enciphered data,
    deriving a decryption key inside the second token based on the unique second token serial number in combination with the unique first token serial number, where the first token serial number is received from the table of the second token in response to the identification number of the first user and to a valid second user password,
    decrypting the encrypted session key inside the second token using said decryption key,
    transmitting the decrypted session key to the second computer, and deciphering the ciphered data with the session key.

2. The method as claimed in claim 1 including the step of plugging in said first and second hardware tokens into computer ports of said first and second computers.

3. The method as claimed in claim 1 including the step of incorporating said first and second hardware tokens in said first and second computers.

4. The method as claimed in claim 1 including the steps of:
    storing in said first and second hardware tokens and in the tokens of all computers with which secure communication may take place a table of information related to the identification and serial numbers of all such tokens.

5. A system for providing ciphered communications between interconnected first and second computers comprising:
    first and second hardware tokens each having an unduplicated and unalterable serial number,
    means for storing secret user passwords in a non-volatile memory inside each token,
    means for providing a table inside each hardware token that lists the serial numbers for tokens of all possible respondents in the communication system together with their identification numbers,
    means for generating a random session key inside the first token belonging to the first user who wishes to start the ciphered communication as a response to a valid first user password,
    means for deriving an encryption key inside the first token based on the unique first token serial number in combination with the unique second token serial number, where the second token serial number is received from the above table in response to the identification number of the respondent,
    means for encrypting a random session key using said encryption key,
    means for supplying the encrypted session key together with the unencrypted session key to said first computer where the unencrypted session key is used as a ciphering key for ciphering the data to be securely transmitted,
    means for transmitting the said enciphered data together with said encrypted session key to the recipient's computer,
    means for receiving of the enciphered data together with the encrypted session key by the recipient,
    means for supplying the encrypted session key to said second hardware token together with the identification number of the first user who transmitted the enciphered data,
    means for deriving a decryption key inside said second token based on the unique second token serial number in combination with the unique first token serial number, where the first token serial number is received from the table of the second token in response to the identification number of the first user and to a valid second user password,
    means for decrypting the encrypted session key inside said second token using said decryption key,
    means for transmitting the decrypted session key to said second computer, and
    means for deciphering the ciphered data with said session key.

* * * * *